United States Patent [19]

Bennett

[11] Patent Number: 4,624,043
[45] Date of Patent: Nov. 25, 1986

[54] QUICK RELEASE TOOL HOLDER FOR ROBOTS

[75] Inventor: David M. Bennett, Seattle, Wash.

[73] Assignee: The Boeing Company, Seattle, Wash.

[21] Appl. No.: 427,243

[22] Filed: Sep. 29, 1982

[51] Int. Cl.⁴ .................................................. B23Q 3/155
[52] U.S. Cl. ........................................ 29/568; 269/52;
269/237; 279/2 A; 279/106; 277/144; 294/97;
901/37; 901/39
[58] Field of Search .................... 29/568, 26 A, 26 R;
279/1 A, 1 G, 1 H, 1 TS, 2 A, 106, 109, 35, 38,
39, 40; 408/56, 59, 61; 414/4; 277/109, 143,
144, 177, 168, 169, 170; 901/31, 37, 39, 41;
294/95, 97; 285/338; 339/15, 16 R; 269/237, 52

[56] References Cited

U.S. PATENT DOCUMENTS

| 190,043 | 4/1877 | Hurd | 279/106 |
|---|---|---|---|
| 498,835 | 6/1893 | Atterbury | 279/106 |
| 859,813 | 7/1907 | Hartmann | 277/144 |
| 2,852,935 | 9/1958 | Lien | 279/2 |
| 2,889,150 | 6/1959 | Goldring et al. | 279/4 |
| 3,229,656 | 1/1966 | Bodey | 901/50 |
| 3,463,500 | 8/1969 | Collins | 279/2 |
| 3,953,039 | 4/1976 | Hague et al. | 279/1 TS |
| 4,077,736 | 3/1978 | Hutchens | 279/1 A |
| 4,164,879 | 8/1979 | Martin | 408/59 |
| 4,226,562 | 10/1980 | Schmid et al. | 279/1 A |
| 4,332,066 | 6/1982 | Hailey et al. | 408/111 |
| 4,365,928 | 12/1982 | Baily | 901/31 |
| 4,370,091 | 1/1983 | Gagliardi | 414/738 |

FOREIGN PATENT DOCUMENTS

| 1279907 | 10/1968 | Fed. Rep. of Germany | 901/31 |
|---|---|---|---|
| 157912 | 12/1981 | Japan | 409/2 |

*Primary Examiner*—Gil Weidenfeld
*Assistant Examiner*—Daniel W. Howell
*Attorney, Agent, or Firm*—William C. Anderson; John Michael Neary

[57] ABSTRACT

A releasable tool holder (75) for quickly interchanging tools usable by a conventional robot (50) having one or more articulatable arms (60, 65, 70). The tool holder (75) is mounted to an arm (70) of the robot (50) and is provided with a plurality of variable fulcrum clamping levers (110) capable of engaging a surface (215) of a ring (205) mounting a preselected tool. A fluid motor (95) is connected to a translatable center link (105) that is pivotably attached to the variable fulcrum clamping levers (110) whereby when the motor (95) causes the link (105) to translate, the variable fulcrum clamping levers (110) engage the surface (215) of the tool mounting ring (205). A novel tool mounting ring (205) and a releasable fluid coupling (125) are also provided.

21 Claims, 5 Drawing Figures

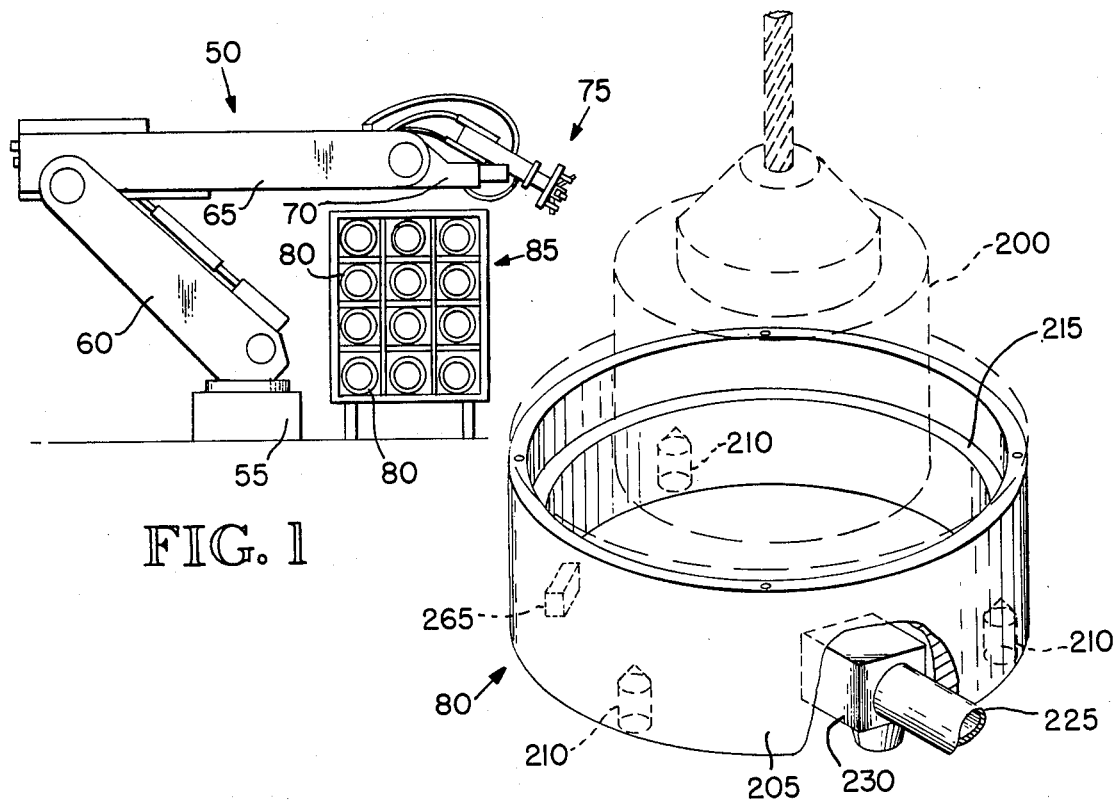
FIG. 1
FIG. 3
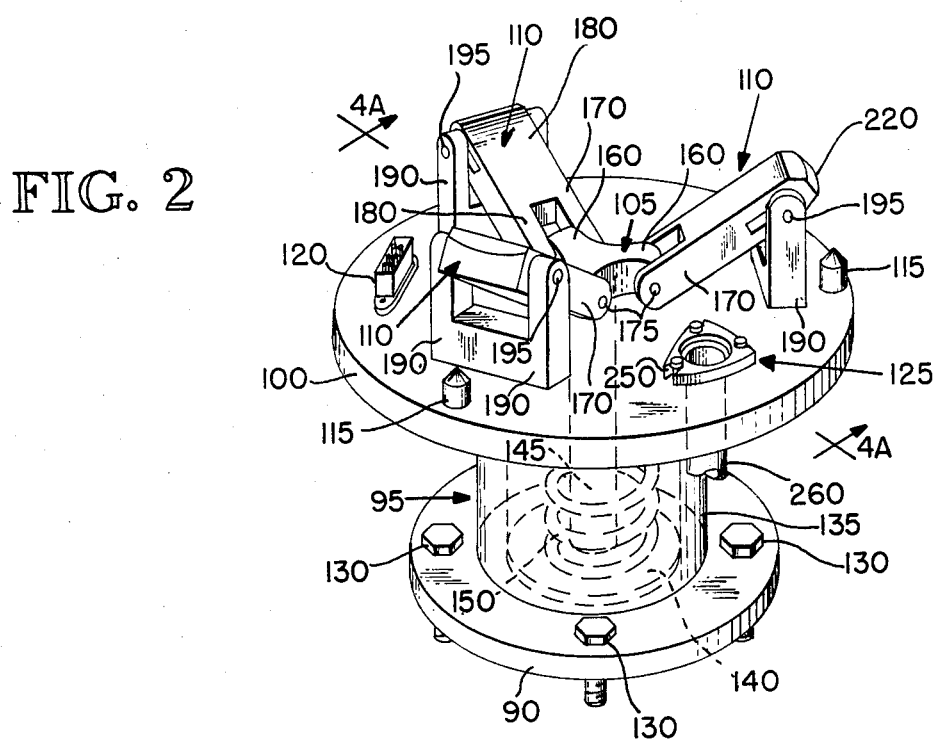
FIG. 2

QUICK RELEASE TOOL HOLDER FOR ROBOTS

TECHNICAL FIELD

The present invention relates generally to the field of robotics and more particularly to a quick release holder facilitating the interchanging and use of tools by a robot.

BACKGROUND OF THE INVENTION

Recently, robots with articulable appendages or arms have seen increasing use. One reason is that robots have manipulative arms which are able to perform certain routine manual or manipulative tasks using accessories such as tools in an efficient and precise manner. For example, robots have shown dexterity in performing such exemplary tasks as robot welding, painting, deburring, routing and tasks or work on objects involving close tolerances such as, e.g., the insertion of a pin into a bore.

It is highly desirable to enable the robot to perform as many tasks, using as many tools, as possible in a given time period. Efficiency can be increased, therefore, by providing a fast and simple method enabling the robot to pick up, use and put down any number to tools.

In one method, tools are directly mounted to a plate on the robot. While this method is satisfactory if only one tool is to be used by the robot, it is unsatisfactory if a number of tools are to be used in rapid succession. Clearly, the interchanging of tools by bolting and unbolting each tool is time consuming and potentially complicated.

General purpose tool grippers have also been used with robots. However, conventional grippers limit the size of the tools capable of use by the robot. Further, the air and/or electrical connections necessary to power and control the tools are difficult to make in an automatic and efficient manner.

SUMMARY OF THE INVENTION

The preferred embodiment of the present invention provides a tool holder for quickly interchanging tools capable of use by a conventional robot. The present tool holder comprises a base plate upon which a tool may be mounted. A plurality of support posts are fixed to the base plate. A plurality of lever arms, capable of engaging the tool, are pivotably and slidably connected to the posts. A link, translatable along an axis, is pivotably connected to each of the lever arms whereby when the link is translated in one direction along the axis, the lever arms engage the tool and when the link is translated in another direction along the axis, the lever arms disengage the tool.

The present invention also provides a mount for a power tool requiring electrical and fluid energy. The mount comprises a ring attached to the tool. The ring is provided with a clamping surface and an electrical connector is mounted therein. Finally, a fluid tube is carried within the ring.

The instant invention also provides a releasable coupling for sealingly connecting a fluid conducting tube to a supply of fluid. The coupling is provided by means of a base plate having a bore. The bore is connected to the fluid supply and has a ring disposed thereover. The ring is mounted relative to the bore so that the ring may be moved with respect to the bore. The tube and ring are provided with mating surfaces thereby facilitating insertion of the tube into the ring. Finally, a compressible material is juxtaposed between the ring and the base plate whereby when the tube is inserted within the ring, the material is compressed and the tube is sealed with respect to the fluid supply.

BRIEF DESCRIPTION OF THE DRAWINGS

FIG. 1 illustrates a preferred embodiment of the present invention in conjunction with a conventional robot that has several articulable arms.

FIG. 2 is an enlarged perspective view of the preferred embodiment of the present invention.

FIG. 3 is an enlarged perspective of a tool fixture assembly forming a part of the present invention.

DETAILED DESCRIPTION OF THE PREFERRED EMBODIMENT

Figure 4A:
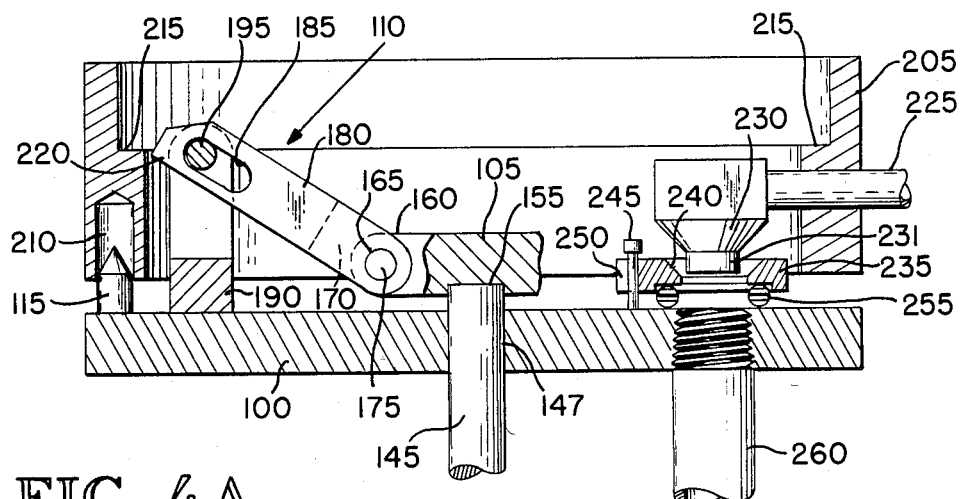
FIGS. 4A and 4B are side elevational views of the preferred embodiment of the present invention illustrating the operation of the present invention.

Referring now to the Figures, wherein like reference characters refer to the same or similar elements and more particularly to FIG. 1 wherein the preferred embodiment of the present invention is illustrated in conjunction with a conventional robot 50. While the robot 50 does not form a part of the present invention, it will be briefly described for purposes of completeness and clarity.

The robot 50 comprises a rotatable base 55 to which is pivotably attached a first articulable arm 60. The first arm 60 is pivotably attached to a second articulable arm 65 having at one of its ends a third articulable arm 70. At the distal portion of the third articulable arm 70 is disposed a quick release tool holder 75 of the present invention.

In accordance with the present invention, various tools (not shown in FIG. 1), mounted on tool fixture assemblies 80 forming a part of the present invention, may be used by the robot 50 to perform certain operations on a work object. The various tool fixture assemblies 80 may be stored in a storage cabinet 85 schematically illustrated in FIG. 1. While the storage cabinet 85 is shown as vertically disposing the various tool fixture assemblies 80, the tool fixture assemblies would normally be stored in a horizontal plane enabling ready engagement and disengagement with the quick release tool holder 75 of the present invention.

Referring now to FIG. 2, the preferred embodiment of the quick release tool holder 75 is shown as comprising a mounting plate 90; a fluid motor 95; a base plate 100; a center link 105, translatable in two directions along a common axis; a plurality of variable fulcrum levers 110; a plurality of alignment pins 115; an electrical connector 120 and a novel releasable fluid coupling 125 for a fluid conducting line.

The preferred embodiment of the present quick release tool holder 75 may be attached to the third articulable arm 70 of the conventional robot 50 illustrated in FIG. 1 by means of the mounting plate 90 and a plurality of conventional mounting bolts 130. Carried by or fastened to the mounting plate 90 is the motor 95 comprising a cylinder 135 and a piston 140 freely translatable therein. A source of fluid such as hydraulic fluid (not shown) may be supplied to the motor 95 to force the piston 140 to travel within the cylinder. A piston rod 145 is attached to the piston 140 and is surrounded by a compressible spring 150, juxtaposed between the piston 140 and the base plate 100, which returns or biases the piston 140 towards the mounting plate 90.

The piston rod 145 passes through a bore 147 (see FIGS. 4A, 4B) formed within the base plate 100 and is freely translatable therein. The center link 105 is attached to the end 155 (see FIGS. 4A, 4B) of the piston rod and is provided with three legs or protuberances 160 each having a lateral bore (not shown clearly, but see FIGS. 4A, 4B) provided at the distal end thereof. Loosely fitted within each of the bores of the link 104 and a bore 165, formed in a U-shaped end 170 of each of the variable fulcrum levers 110, is a pin 175 whereby each of the variable fulcrum levers 110 may be pivoted in use.

Each of the variable fulcrum levers 110 also comprise a leverl arm 180 having a slot 185 which forms a variable fulcrum surface as will be understood. A U-shaped lever arm support post 190, carried by the base plate 100, is connected to the lever arm 180 by means of a pin 195 extending through the slot 185 whereby the lever arm 180 is allowed to slide upwardly and outwardly when the piston 140 rises within the cylinder 135 as will be more clearly understood hereinafter.

Matable and attachable to the quick release tool holder 75 is a tool fixture assembly 80 selected from the cabinet 85. The tool fixture assembly 80 comprises, e.g., an electrically or pneumatically operated power drill 200 (shown in phantom) and a tool mounting ring 205. In should be clear that although the tool fixture assembly 80 is illustrated is FIG. 3 as comprising the power drill 200, any other power tool may be utilized. The tool mounting ring 205 comprises a plurality of alignment pin recesses or receptacles 210 which in use will receive the alignment pins 115 (see FIGS. 4A, 4B). Disposed within the tool mounting ring 205 is a circular clamping surface of a ledge 215 which is capable of cooperating with an abutment or an engageable surface 220 of the lever arm 180 (see FIGS. 4A, 4B). Suitably attached or carried within the tool mounting ring 205 is a relatively inflexible tube 225 having a tapered male member 230 near the lower end thereof ending in a nipple 231 and being capable of transporting a motive fluid or a pneumatic fluid. When the quick release tool holder 75 mates with the tool fixture assembly 80, as illustrated in FIGS. 4A, 4B, the male member 230 of the tube 225 is insertable into the releasable fluid coupling 125, described infra.

Figure 4B:
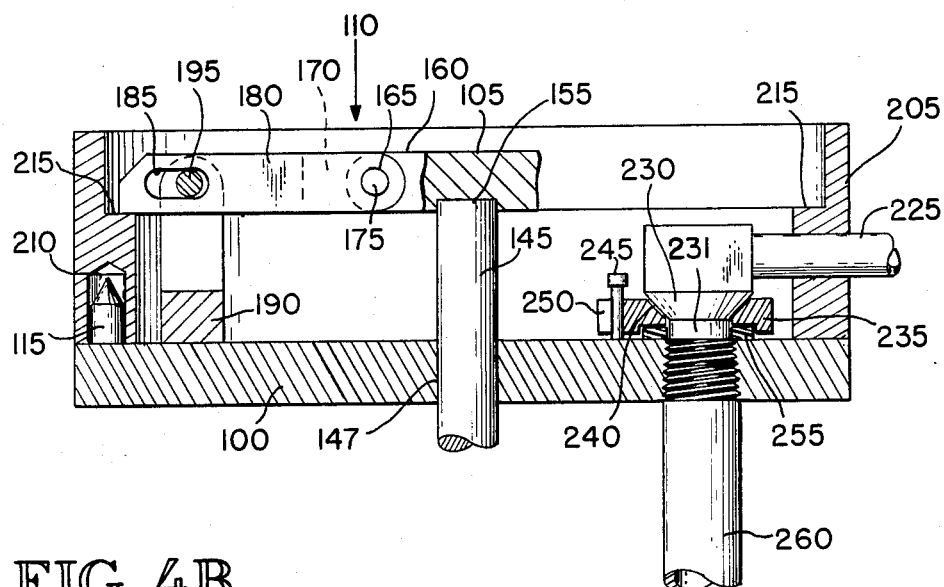

While not illustrated in detail in FIG. 2, the releasable fluid coupling 125 is illustrated in cross-section in FIGS. 4A and 4B. It is shown as comprising a band or a ringlike member 235 having an orifice and a surface 240 adapted to receive the male member 230. The ring 235 is mounted upon the base plate 100 of the quick release tool holder 75 by means of fasteners 245 which loosely fit within a plurality of indentations or notches 250 formed within the ring 235 whereby the ring 235 is capable of lateral and vertical motion with respect to the base plate 100. A compressible elastomeric material such as an O-ring 255 is juxtaposed between the ring 235 and the base plate 100 whereby in use a seal may be provided between a fluid supply line 260, connected to the base plate 100, and the nipple 231, as will be understood hereinafter.

In use, when the nipple 231 is initially positioned proximate the ring 235, as illustrated in FIG. 4A, the male member 230 aligns itself with the surface 240. As the mounting ring 205 is being clamped to the base plate 100, the tube 225 is inserted into the ring 235 and the male member 230 forces the ring 235 towards the base plate 100. Concomitantly, the ring 235 compresses the O-ring 255 and a seal is formed about the nipple 231 (see FIG. 4B).

Optionally, an electrical connector 265 is fastened to the ring 205. The connector 265 is alignable and engageable with the electrical connector 120 as the mounting ring 205 is clamped to the base plate 100.

In use, the robot 50 moves the quick release tool holder 75 over a preselected tool fixture assembly 80. Each assembly 80 is oriented so that the alignment pin receptacles 210 face the quick release tool holder 75. The robot 50 then brings the quick release tool holder 75 into a initial relationship with respect to the selected tool fixture assembly 80 wherein the alignment pins 115, electrical connector 120 and the releasable fluid coupling 125 are respectively in alignment with the alignment pin receptacles 210, electrical connector 265 and the nipple 231, carried by the tool mounting ring 205 (see FIG. 4A). When the base plate 100 of the quick release tool holder 75 is proximate the tool mounting ring 205, the piston 140 is forced to move upwardly within the cylinder 135 by means of hydraulic fluid supplied by a source (not shown). Concomitantly, the piston rod 145 travels thru the bore 147 within the base plate 100 and the center link 105 travels upwardly, as illustrated in FIGS. 4A and 4B. When the center link 105 travels upwardly, it tends to force each lever arm 180 of each variable fulcrum lever 110 upwardly and outwardly whereby the abutting surface 220 of each lever arm 180 engages or contacts the surface 215 of the tool mounting ring 205. As a result, the tool mounting ring 205 is clamped to the base plate 100 of the quick release tool holder 75. Simultaneously, the male member 230 of the tube 225 forces the ring 235 of the releasable coupling 125 against the compressible ring 255 thereby forming a seal between the nipple 231 and the fluid supply tube 260 affixed to the base plate 100 of the quick release tool holder 75.

When it is desired to release the tool fixture assembly 80, hydraulic pressure is removed and the return spring 150 forces the piston 140 and thus the piston rod 145 downwardly towards the mounting plate 90. The center link 105 also moves downwardly towards the base plate 100 whereby each lever arm 175 of each variable fulcrum lever 110 is moved out of contact with the clamping surface 215 of the assembly 80 and the tool mounting ring 205 is released.

It is preferred that sufficient clearance or tolerance exists between all of the mechanical elements of the present invention. For example, there should be a loose fit between the center link 105 and the lever arms 180. There should also be sufficient clearance between each alignment pin receptacle 210 and the corresponding alignment pin 115. Finally, the coupling ring 235 should be loosely supported with respect to the base plate 100 so that the ring 235 may freely move with respect to the base plate 100. These loose clearances insure that the quick release tool holder of the present invention will readiy engage with an be clamped to the desired tool fixture assembly 80.

Changes or modifications in the specifically described preferred embodiment can obviously be carried out by the skilled artisan without departing from the scope of the present invention which is intended to be limited only by the scope of the appended claims.

What is claimed and desired to be secured by Letters Patent of the United States is:

1. A tool holder, comprising:

a base plate having an outwardly facing surface upon which a tool may be mounted, a plurality of support posts coupled to said base plate, a plurality of lever arms each having a radially inner end, and each having a radially outer end which is capable of engaging an outwardly facing engagement surface on said tool, means for pivotally connecting said lever arms to said posts adjacent to one end of said lever arms such that the connection point there between translates laterally with respect to one of said lever arms and said base plate, a link translatable in either direction along a common axis, means for pivotally connecting each of said lever arms to said link adjacent to the inner end of said lever arms, and means for translating said link along said axis, whereby when said link is translated along one direction, said lever arms pivot and translate outwardly out over said engagement surface of said tool, and engage said tool with a force that is applied parallel to said axis and towards said base plate, and when said link is translated along another direction, said lever arms pivot and translate radially inward to disengage from said tool.

2. The tool holder of claim 1 further comprising:

means for aligning said tool with respect to said base plate.

3. The tool holder of claim 2, wherein said alignment means comprises:

a plurality of pins mounted upon and extending from said base plate.

4. The tool holder of claims 2 or 3, further comprising:

means forming a ring positioned proximate to but spaced from said base plate; said ring means being capable of being moved towards said base plate; said ring means having a plurality of notches, a plurality of fasteners, attached to said base plate, one of said fasteners being disposed within each of said notches, and an elastomeric ring juxtaposed between said base plate and said ring means, whereby when said ring means is moved towards said base plate, said elastomeric ring is compressed.

5. The tool holder of claim 4, further comprising:

an electrical connector mounted upon said base plate.

6. a mount for a power tool, comprising:

a cylindrical ring adapted for attachment to said tool, said ring having a longitudinal axis;

an outwardly facing, interior circular clamping surface disposed within said ring for engagement by clamping levers on a tool holder for clamping of said ring along axes that are parallel to said longitudinal axis, said clamping surface being spaced from a plane that is at the interface between said mount and said tool, and extending radially inwardly towards said longitudinal axis to enable clamping along axes that are parallel to said longitudinal axis, an electrical connector for supplying power to said tool, said electrical connector being mounted within said ring proximate said plane;

a fluid supply tube carried by said ring, said tube being positioned within said ring proximate said plane, said tube having a terminal portion having a tapered male member for coupling to a source of motive fluid for said tool, and means disposed proximate said plane for aiding in the alignment of said ring so that said ring may be readily clamped.

7. A quick release tool holder having a main longitudinal axis for use with a robot capable of using at least one tool comprising:

a base plate lying in a plane perpendicular to said axis, means for attaching said base plate to said robot, a cylindrical ring having an interior surface, for mounting a tool to be used by said robot, said ring having an outwardly facing clampable surface formed by a shoulder in the interior surface of said ring;

a plurality of support posts extending substantially parallel to said main axis, a lever arm connected to each of said posts for pivoting about an axis transverse to said main axis and for radial translation of said lever arm, a link translatable along said main axis and being pivotally connected to each of said level arms, and motor means for urging said link in both directions along said main axis, whereby when said motor means urges said link in a first direction, each of said levers translates radially outward and pivots towards said clampable surface and forces said clampable surface down towards said base plate, and when said motor means urges said link in a second direction, each of said levers pivots and translates radially inward and releases said clampable surface.

8. The holder of claim 7, wherein said motor means comprises:

a cylinder attached at one end to said base plate, the other end of said cylinder being carried by said robot;

a fluid-actuatable translatable piston disposed within said cylinder, a piston-return spring juxtaposed between said base plate and said piston, and fluid means for actuating and translating said piston.

9. The holder of claim 8, wherein said translatable means comprises:

a rod attached to said piston; said rod passing through a bore formed in said base plate, and a center link having a plurality of protuberances, one of said protuberances being pivotably connected to one of said lever arms.

10. The holder of claims 7 or 9, further comprising:

a plurality of pins extending from said base plate, a plurality of bores formed in said ring for receiving said pins, whereby said ring may be aligned with said base plate as said ring is being clamped to said base plate.

11. The holder of claim 10, further comprising:

an electrical connector carried by said base plate, and means forming an electrical connector carried by said ring capable of being in alignment an electrically mating with said base plate connector as said ring is being clamped to said base plate.

12. The holder of claim 11, further comprising:

a fluid conducting tube carried by said ring, sealing means receiving said tube as said ring is being clamped to said base plate forming a seal with said tube, and fluid supply means connected with said base plate and connectable to said tube.

13. The holder of claim 12, wherein said sealing means comprises:
means forming a band having a surface facilitating the reception of said tube; said band means being disposed adjacent to said base plate and being capable of movement relative to said base plate, and
an elastomeric ring positioned between said band means and said base plate, whereby when said ring is being clamped to said base plate and said tube is being received within said band means, said elastomeric ring is compressed and seals said tube so that fluid may be supplied to said tube from said fluid supply means.

14. A releasable fluid seal for connecting a fluid conducting conduit to a fluid source, comprising:
means forming a base having a bore communicating with said fluid source,
means forming a band disposed proximate said base means, said band means having a tapered surface capable of readily receiving the insertion of said conduit therethrough;
means loosely connecting said band means to said base means and allowing relative movement of said band means with respect to said base means when said conduit is being connected to and disconnected from said fluid source by being moved towards and away from, respectively, said base means, said connecting means comprising a plurality of indentations disposed about the periphery of said band means, and a fastener disposed in each indentation and fixed to said base means, said fastener having a head positioned above said base a distance greater than the upper surface of said band such that said fasteners allow said band to float laterally and vertically to self-align with said fluid conduit when said conduit is brought into contact with said tapered surface of said band, and
a compressible material disposed between said base means and said band means, whereby when said conduit is moved towards said base means, said compressible material is compressed about said conduit and between said band means and said base means thereby forming a seal, and when said conduit is moved away from said base means, said seal is released.

15. The seal of claim 14, wherein said compressible material comprises:
an elastomeric O-ring.

16. A tool holder, comprising:
a base plate upon which a tool may be mounted;
a plurality of support posts fixed to said base plate;
means for aligning said tool with respect to said base plate;
a plurality of lever arms capable of engaging said tool;
means for pivotably and slidably connecting one end of said lever arms to said post;
a link translatable in a plurality of directions along a common axis;
means for pivotably connecting each of said lever arms to said link,
means for translating said link, whereby when said link is translated along one direction, said lever arms pivot and slide and engage said tool to provide a force that is applied parallel to said axis and towards said base plate and when said link is translated along another direction, said lever arms pivot and slide and disengage from said tool,
means forming a ring positioned proximate to but spaced from said base plate, said ring means being capable of being moved towards said base plate and having a plurality of notches,
a plurality of fasteners attached to said base plate, one of the said fasteners being disposed within each of said notches, and
an elastomeric ring juxtaposed between said base plate and said ring means, whereby when said ring means is moved towards said base plate, said elastomeric ring is compressed.

17. The tool holder of claim 16, wherein said alignment means comprises:
a plurality of pins mounted upon and extending from said base plate.

18. The tool holder of claim 16, further comprising:
an electrical connector mounted upon said base plate.

19. A quick release tool holder for use with a robot capable of using at least one tool, comprising:
a base plate;
means for attaching said base plate to said robot;
a cylindrical ring for mounting a tool to used by said robot, said ring having an inwardly disposed clampable surface;
a plurality of support posts extending along axes that are transverse to said base plate;
a lever arm slidably and pivotably connected to each of said posts, whereby a variable fulcrum is created;
means tanslatable along another axis parallel to the axes of said posts and being pivotably connected to each of said lever arms,
motor means for urging said translatable means in two directions along said another axis, whereby when said motor means urges said translatable means in a first direction, each of said levers slides and pivots towards said clampable surface and forces said clampable surface down towards said base plate, and when said motor means urges said translatable means in a second direction, each of said levers pivots and slides and releases said clampable surface,
a plurality of pins extending from said base plate,
a plurality of bores formed in said ring for receiving said pins, whereby said ring may be aligned with said base plate as said ring is being clamped to said base plate,
an electrical connector carried by said base plate,
means forming an electrical connector carried by said ring capable of being in alignment and electrically mating with said base plate connector as said ring is being clamped to said base plate,
a fluid conducting tube carried by said ring,
sealing means receiving said tube as said ring is being clamped to said base plate forming a seal with said tube,
said sealing means including means forming a band having a surface facilitating the reception of said tube;
said band means being disposed adjacent to said base plate and being capable of movement relative to said base plate,
an elastomeric ring postioned between said band means and said base plate, whereby when said ring is being clamped to said base plate and said tube is being received within said band means, said elastomeric ring is compressed and seals said tube so that fluid may be supplied to said tube from said fluid supply means, and fluid supply means connected with said base plate and connectable to said tube.

20. A quick-release tool holder as defined in claim 19, wherein said motor means comprises:
- a cylinder attached at one end to said base plate; the other end of said cylinder being carried by said robot,
- a fluid-actuable translatable piston disposed within said cylinder,
- a piston-return spring juxtaposed between said base plate and said piston, and
- fluid means for actuating and translating said piston.

21. The quick-release tool holder defined in claim 20, wherein said translatable means comprises:
- a rod attached to said piston, said rod passing through a bore formed in said base plate, and
- a center link having a plurality of protuberances, one of said protuberances being pivotably connected to one of said lever arms.

* * * * *